UNITED STATES PATENT OFFICE.

JOSEPH A. SHINN, OF PITTSBURG, PENNSYLVANIA, ASSIGNOR TO FIREPROOF MATERIALS COMPANY, A CORPORATION OF NEW YORK.

ARTICLE OF MANUFACTURE.

No. 845,825.     Specification of Letters Patent.     Patented March 5, 1907.

Application filed April 9, 1906. Serial No. 310,761. (Specimens.)

*To all whom it may concern:*

Be it known that I, JOSEPH A. SHINN, a citizen of the United States, and a resident of Pittsburg, in the county of Allegheny and State of Pennsylvania, have invented a certain new and useful Improved Article of Manufacture, of which the following is a specification.

This invention relates to a new composition for use in various lines, but is particularly adapted for use as fireproofing material and for electrical work on account of its high fireproof qualities and non-conducting qualities and low specific gravity.

My new material is made by mixing about ninety-two to ninety-five per cent. of finely-powdered ashes resulting from the combustion of anthracite coal and from five to eight per cent. of lime, also powdered in form, and after a small quantity of water is added, the amount being just sufficient to moisten the mass, so that it will adhere together by a pressure of from three to four thousand pounds per square inch, in the form in which it is to be used, I subject the material to the action of saturated steam under a pressure of from one hundred and fifty to one hundred and seventy-five pounds per square inch and allow it to remain until the lime becomes firmly set by the action of the heat and moisture contained in the steam.

The new material has the following characteristics: It can be cut or sawed or bored with an auger, and nails can be driven into it without cracking it. It has a considerably greater tensile strength than that of lime and sand when united, is practically a non-conductor of electricity, and is a fine non-conductor of heat. It will stand a high degree of heat without disintegrating and is therefore a fine material for use in fireproofing buildings. It is light in weight compared to sand and lime mixtures and will not absorb moisture to so great a degree. Its natural color is gray, and this renders it of special value, as it may be used to a great extent in the building arts without artificial coloring. It will stand a compression force of about five thousand pounds to the square inch before crushing and has a certain amount of elasticity, which is an important factor in making it of use in the building arts.

The above facts as to its qualities will show that it is not the same material as would result from an ordinary mixture of ashes and lime in the same proportions without the process of heating. The proportions may be changed from those given to some extent without changing its good qualities to any great extent; but I find that the less lime I use, so long as I use enough to act as a binder, the less the product will cost. The moist steam heat permeates the entire mass, and therefore I do not add any more moisture in assembling the mixture than is absolutely required to form it and leave the hot moist steam to set the lime in a practically calcined condition.

Having thus described my invention, what I claim as new, and desire to secure by Letters Patent, is—

1. The herein-described composition consisting of anthracite-coal ashes about ninety-two parts and lime eight parts set by moist heat as described.

2. The herein-described composition consisting of anthracite-coal ashes and a binding material of lime set by steam heat under a pressure of upward of one hundred pounds per square inch as set forth.

3. The herein-described composition produced by mixing anthracite-coal ashes in granular form with lime in proportion, ashes from eighty-five to ninety-five per cent. and lime from fifteen to five per cent. respectively, the said lime and ashes being first formed by pressure after being slightly moistened to hold the ingredients together and afterward subjected to the action of steam heat as described.

Signed at New York city, in the county of New York and State of New York, this 19th day of March, A. D. 1906

JOSEPH A. SHINN.

Witnesses:
   CLARENCE L. WESTCOTT,
   E. C. SIMONSON.